A. J. WOLFF.
VEHICLE WHEEL.
APPLICATION FILED DEC. 8, 1910.
1,188,598.
Patented June 27, 1916.
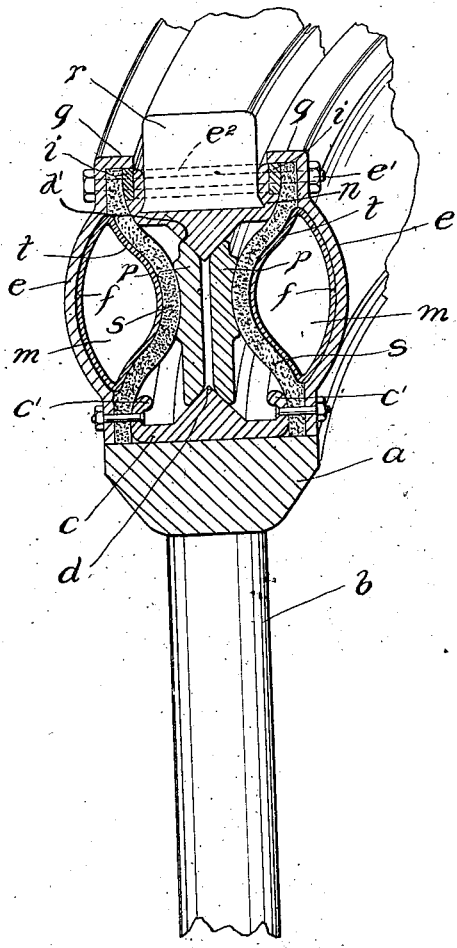
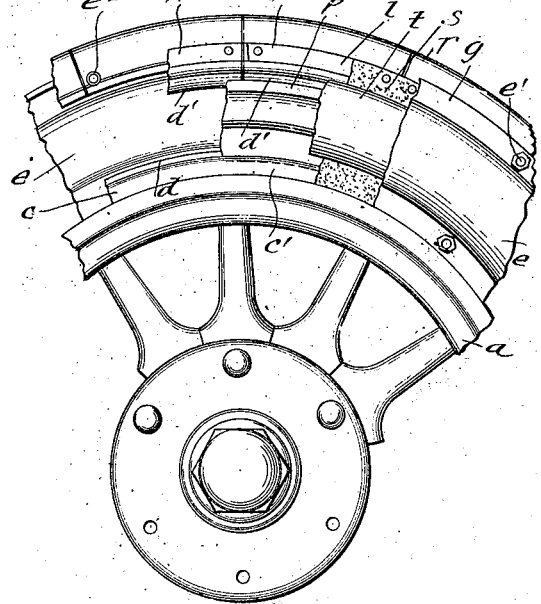
WITNESSES:
INVENTOR
Arthur J. Wolff
BY
his ATTORNEY.

UNITED STATES PATENT OFFICE.

ARTHUR J. WOLFF, OF HARTFORD, CONNECTICUT.

VEHICLE-WHEEL.

1,188,598.  Specification of Letters Patent. Patented June 27, 1916.

Application filed December 8, 1910. Serial No. 596,211.

*To all whom it may concern:*

Be it known that I, ARTHUR J. WOLFF, a citizen of the United States, and a resident of Hartford, in the county of Hartford, State of Connecticut, have invented certain new and useful Improvements in Vehicle-Wheels, of which the following is a specification.

This invention relates particularly to improvements in automobile wheels.

It is I believe generally acknowledged that the pneumatic tire is the most satisfactory tire which has yet been devised for automobile work, primarily for the reason that it furnishes the most effective and scientifically correct cushion between the ground and the hub of the wheel, absorbing and eliminating to the greatest possible extent the shocks incident to the travel of the wheel over the road. At the same time the pneumatic tire of the best type is continually subject to the possibility of puncture, which immediately puts it out of commission. A great many efforts have been made to produce a non-puncturable pneumatic tire, but in practically every case where a non-puncturable shoe has been perfected the resiliency of the tire has been seriously impaired.

One of the heaviest items in the up-keep of an automobile is tire expense, and there has long been a demand for a tire having a non-puncturable tread at the same time providing for the absorption or elimination of shock to the extent accomplished by the most sensitive pneumatic tire.

It is the object of my invention to provide a vehicle wheel to meet these requirements.

In the drawing I have illustrated one embodiment of my invention.

Figure 1 is a transverse sectional view of a wheel embodying my invention. Fig. 2 is a side elevation of part of a wheel embodying my invention parts being broken away to show construction.

Referring to the drawings $a$ is the felly and $b$ the spokes connecting the felly with the hub, which is not shown.

$c$ denotes a metallic band secured centrally on the felly having upstanding side flanges $c'$, $c'$ and a central wedge $d$.

$e$, $e$, are annular metallic side plates secured along their inner edges to the flange $c'$ of the band $c$ which is firmly attached to the felly, the outer edges of these side plates being connected by stay-bolts $e'$ and spaced apart by sleeves $e^2$ on the stay bolts so as to maintain the outer edge of these plates in fixed relation to one another. Seen from the inside these side plates are oppositely concaved in their central portions as indicated at $f$. The outer edges of the side plates are inturned to form overhanging flanges $g$, $g$.

$s$ $s$ represent shoes preferably made of rubber and of a character similar to the ordinary shoe of a pneumatic tire, these shoes being secured along their inner edges between the inner edges of the side plates $e$ and the flange $c'$ and firmly secured in place in some desirable way. The outer edges of the shoes are clamped between the outer edges of the side plates $e$, $e$, and rings $i$, $i$, and are securely bolted in place. It will be understood that these shoes are of annular form and in their central portions are concaved opposite to the concavity of the opposed side plates $e$, $e$, thus forming a pair of chambers $m$, $m$, at each side of the wheel rim. An inflatable tube $t$ is located in each of these chambers, each provided with a suitable valve so that the desired amount of air under pressure can be supplied.

Between the shoes $s$, $s$, are located a pair of annular spreading plates $p$, $p$ having their edges oppositely flared to receive the wedge $d$ on the ring $c$ and a wedge $d'$ on the underside of the tread which is made up of the tread blocks $r$ of rubber or other suitable material mounted on the base plates $n$ from the underside of which the wedges $d'$ project. These plates are preferably arranged together end to end to form a continuous tire about the periphery of the wheel.

It is to be understood that the tread made up of tread block, base plate and its wedge is capable of moving inwardly and outwardly, though of course it is prevented from throwing off or disengaging itself from the wheel by any suitable means.

Now it will be understood that when the load comes onto the tread it is forced in toward the hub and the wedges $d$, $d'$ spread the plates $p$, $p$ against the shoes $s$, $s$. It will also be seen that when the tread is subjected to any shock, the force of that shock which is primarily directed radially toward the hub, is by the wedges transferred in a lateral direction against the pneumatic chambers $m$, $m$, the outer sides of which are rigidly supported by the metallic side plates $e, e$ the shock being thus transmitted to the air cushion and by it absorbed and eliminated.

Broadly considered my invention resides in the use of a solid or non-puncturable tread and interposing between the tread and the wheel felly preferably a plurality of pneumatic cushions in such a way and with such interposing devices that the radially directed shock is changed into a lateral shock which is delivered against the pneumatic cushions and by it absorbed and eliminated.

In the foregoing description of the single embodiment of the invention illustrated in the drawings I desire it to be understood that the terms used are terms of description and not of limitation.

I am aware that my invention, the broader aspect of which I have just above set forth, can be utilized in various ways which may or may not closely resemble the embodiment used for the purpose of illustration and description, and it is my intention that the appended claims shall cover any and all embodiments or modifications coming within the scope of my invention.

I claim:—

1. The combination with a vehicle wheel provided with pneumatic cushions arranged at the sides of the rim, and a tread, of laterally movable means interposed between said tread and said cushions and adapted to be actuated by the former.

2. The combination with a vehicle wheel provided with pneumatic cushions at the opposite sides of the rim, a tread encircling said wheel but separate therefrom, of means interposed between said tread and wheel comprising oppositely arranged wedges on said wheel and tread and laterally movable members actuated by said wedges upon the movement of said tread for the purposes specified.

3. A vehicle wheel comprising the hub, spokes and felly, a pair of oppositely arranged annular metallic plates secured along their inner edges to said felly, the outer edges of said plates being secured together and spaced apart, annular shoes arranged opposite each of said plates with their edges firmly secured to said plates to form chambers, an inflatable tube in each chamber, a tread encircling said wheel but separate from said felly, and means interposed between said tread and said pneumatic cushions whereby the inward movement of said tread, due to load or shock, is caused to exert its force laterally against said cushions.

4. A vehicle wheel comprising the hub, spokes and felly, a pair of pneumatic cushions secured to said felly and arranged at opposite sides of the rim, metallic side plates supporting the outer sides of said chambers, a tread encircling said wheel but separate therefrom and adapted for movement toward the hub under load or shock, a pair of annular rings located between said chambers and having oppositely flared edges, and wedges on said felly and tread adapted for coöperation with the flared edges of said rings.

ARTHUR J. WOLFF.

Witnesses:
G. B. LYNCH,
H. E. HART.